A. SONSTHAGEN.
MACHINE FOR MIXING CHOCOLATE OR OTHER MATERIAL.
APPLICATION FILED JAN. 24, 1922.
1,426,118.
Patented Aug. 15, 1922.
2 SHEETS—SHEET 1.
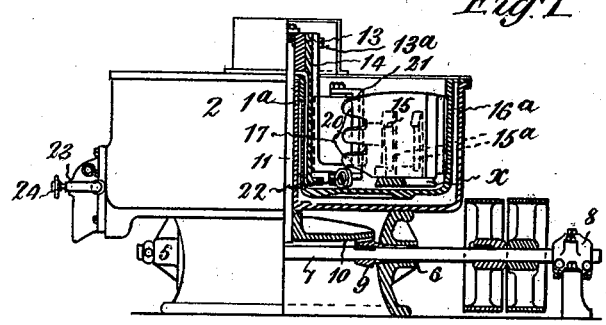
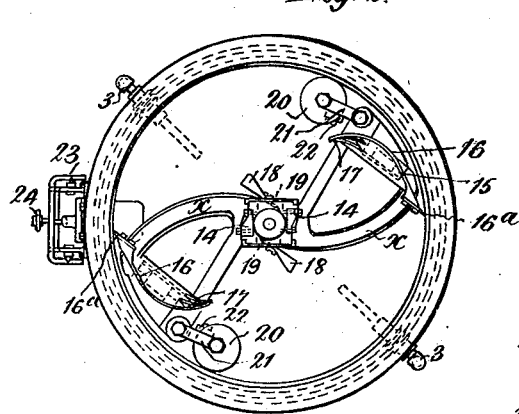
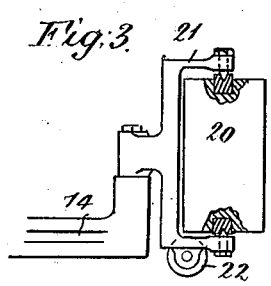
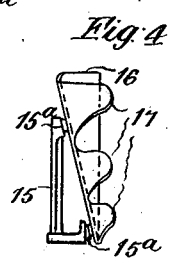
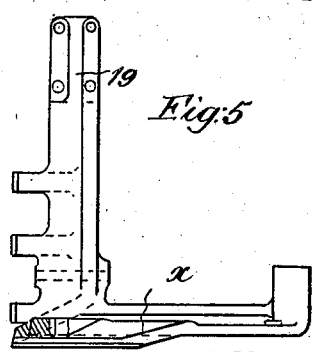
Witnesses:
Inventor:
Asbjorn Sonsthagen,
By his Att'y,

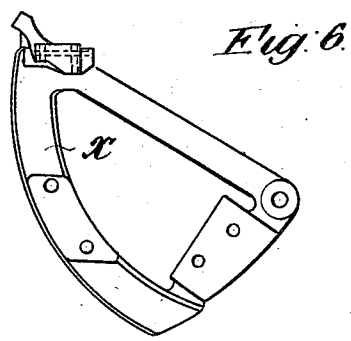
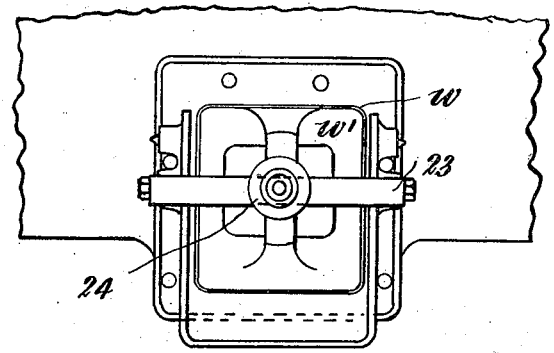
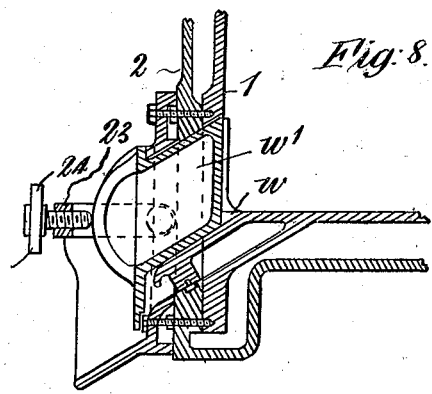

UNITED STATES PATENT OFFICE.

ASBJORN SONSTHAGEN, OF LEYTONSTONE, ENGLAND.

MACHINE FOR MIXING CHOCOLATE OR OTHER MATERIAL.

1,426,118. Specification of Letters Patent. Patented Aug. 15, 1922.

Application filed January 24, 1922. Serial No. 531,436.

*To all whom it may concern:*

Be it known that I, ASBJORN SONSTHAGEN, a subject of the King of Norway, residing in Leytonstone, Essex, England, have invented certain new and useful Improvements in and Relating to Machines for Mixing Chocolate or Other Material, of which the following is a specification.

This invention relates to improvements in and relating to machines for mixing chocolate or other material and it refers to machines of the stationary vertical tank or pan type.

The present invention has for its object certain improvements in machines of the above type designed to secure the more efficient and rapid mixing of the material.

In order that the invention may be the better understood drawings are appended in which :—

Fig. 1 is a part vertical sectional view of a machine embodying the present improvements,

Fig. 2 is a plan,

Fig. 3 is a part sectional view showing the arrangement of the roller for refining the material, Fig. 4 is an end elevation of one of the mixing plates, Fig. 5 is an elevation of the supporting member for the mixing plate, Fig. 6 is a plan of same, Fig. 7 is a front view of the closure for the aperture by which the material is discharged from the machine, Fig. 8 is a transverse sectional elevation of said closure.

Referring to the accompanying drawings 1 indicates the pan or tank of the machine which is jacketed as shown by means of an outer case 2 whereby a cooling or heating medium may be employed the heating preferably being effected by means of so-called silent steam heaters, indicated by 3. The case 2 is mounted upon a suitable base or pedestal indicated by 4 said base being provided with bearings 5, 6 in which is mounted a shaft 7, provided with the usual fast and loose pulleys. The overhanging portion of shaft 7 is supported by means of a bracket 8.

Mounted upon and secured to the shaft 7 is a bevel pinion 9 engaging a bevel wheel 10 secured to the lower end of a vertical shaft 11 supported in a vertical bearing 12 formed upon the inner surface of the outer case 2.

In order to prevent the entry of the material, being treated, into the bearing 12 the pan 1 is provided with a tubular extension $1^a$ surrounding the bearing 12 as shown in Fig. 1.

The upper end of the shaft 11 extends beyond the upper end of bearing 12 and has secured to it in any convenient manner a boss or head 13 having formed in it at diametrically opposite points channels or recesses each designed to engage the upper end of a substantially U-shaped member 14 secured to said head by means of bolts $13^a$.

The base of member 14 is of substantially triangular outline as shown more clearly in Figs. 2 and 6 the front or leading edge of the base being curved as shown at $x$ whereby the material is urged outwards towards the wall of the pan.

Secured to the horizontal member of the member 14 is a vertical bracket 15 having thereon lugs or projections $15^a$ to which is secured a plate 16 having thereon inwardly directed curved arms 17 shaped as shown and the purpose of which is to direct the material from the outer peripheral or wall of the pan inwards, at the same time imparting a turning motion thereto at different heights. Similar plates 18 are provided upon the inner vertical member of the member 14 to direct the material outwards. Scrapers 19, combined with plates 18, serve to remove the material from the exterior of the bearing 12 and so prevent any deposit upon said bearing. A similar scraper may be provided upon the plate 16 at $16^a$.

20 indicates rollers supported by frames 21 each pivotally mounted upon the bolt $21^a$ on the outer vertical arm of the U-shaped member 14 and which rollers bear against the inner surface of the wall of the pan and so exert a crushing or refining action upon the material. In order to support the weight of the rollers 20 a roller 22 is provided upon frame 14 said roller running upon the bottom of the pan. The bolt $21^a$ may be loosened and clamped tight for adjusting the position of the roller with respect to the wall of the pan whereby the fineness of the material may be varied.

The roller may be positively driven in any suitable manner or driven only by centrifugal force holding in contact with the wall of the pan. Instead of a roller a body or bodies may be employed arranged to slide over the wall of the pan, springs being employed, if desired, to retain the said bodies in contact with the wall of the said pan.

In order to prevent the material from exerting any action tending to oppose the rotation of the rollers 22 an extension may be provided upon the frame 21 carrying a suitably shaped plate the action of which is to direct the material to the wall of the pan behind the said roller.

In order to enable the pan to be emptied an opening is provided at $w$ for which a closure $w^1$ is provided said closure being secured in position by means of the swing frame 23 and screw 24.

Claims:

1. A machine for mixing chocolate or other material comprising a suitable pan, a body revolving in said pan, outer plates upon said body arranged adjacent the wall of the pan and designed to direct the material inwards towards the center thereof, so shaped and arranged as to impart thereto a turning over movement at different heights, other similar plates to direct the material outwards from the center of the pan said plates being so shaped and arranged as to cause the material to be downwardly directed towards the bottom of said pan, and backwardly outwardly curved means at the bottom of said pan whereby the effective mixing is secured.

2. In a machine according to claim 1, a roller disposed adjacent the wall of the pan just behind the outer plate whereby the material is subjected to a grinding or refining operation.

3. In a machine according to claim 2, means for adjusting the position of the roller with respect to the wall of the pan whereby the thickness of the film of material operated upon may be varied.

4. In a machine according to claim 2, a scraper disposed behind the roller acting to crush or refine the material said scraper serving to direct the material after it has been crushed towards the center of the pan.

5. A machine according to claim 3, a roller resting on the bottom of the pan and constructed, arranged and operating to support the first named roller.

6. In combination, a pan; a vertical roller rotating and revolving in said pan relative to the bottom of the pan near the outer wall thereof; and means engaging the bottom of the pan and supporting the roller.

7. In combination, a pan; a vertical roller revolving in said pan against the outer wall thereof; and a supporting roller for the vertical roller engaging the bottom of the pan.

8. In combination, a pan; a body revolving in said pan and having outer arms; rearwardly disposed vertical frames adjustably pivoted to said outer arms; vertical rollers rotatable in the rear part of said frames; and supporting rollers on said frame adapted to be revolved against the bottom of the pan.

9. In combination, a pan having a substantially flat bottom and an upstanding side wall and a central tubular extension; a rotary shaft in said extension; U-shaped members secured at opposite sides to said shaft and having outer and inner arms leaving a wide unobstructed space between, and a base member outwardly backwardly inclined to scrape material from said bottom and toward said side wall; and scrapers on said outer arms.

10. In combination, a pan having a substantially flat bottom, upstanding side wall and a central tubular extension; a rotary shaft in said extension; U-shaped members secured at opposite sides to said shaft and having outer and inner arms leaving a wide unobstructed space between; a forwardly disposed outer plate secured to the outer arm or bracket of said U-shaped member and having its forward edge engaged with said side wall, and its rear part inclined away from said wall; and plates secured to the inner arms of the U-member and having their forward edges scraping said tubular extension.

11. In combination, a pan; a body revolving over said pan; and a forwardly disposed outer plate secured to said body having its forward edge engaged with said side wall, and its rear part upwardly increasingly inclined away from said wall.

12. In combination, a pan; a body revolving in said pan and having a base and outer and inner arms; and a forwardly disposed outer plate secured to the outer arm having its forward edge engaged substantially from top to bottom of the side wall, and its rear part upwardly increasingly inclined away from said wall to give a turning over motion to material.

13. In combination, a pan having a substantially flat bottom, upstanding side wall and a central tubular extension; a rotary shaft in said extension; U-shaped members secured at opposite sides to said shaft and having outer and inner arms leaving a wide unobstructed space between, and a base member outwardly backwardly inclined to scrape material from said bottom and toward said side wall; and a forwardly disposed outer plate secured to the outer arm or bracket of said U-shaped member and having its forward edge engaged substantially from top to bottom of said side wall, and its rear part upwardly increasingly inclined away from said wall to give a turning over motion to the material.

14. In combination, a pan; a body revolving in said pan and having a base and outer and inner arms; means on said arms and base for giving an outward, upward and inward circulatory movement to material.

15. In combination, a pan having a substantially flat bottom, upstanding side wall and a central tubular extension; a rotary shaft in said extension; U-shaped members secured at opposite sides to said shaft and having a base and outer and inner arms leaving a wide unobstructed space between; and means on said base and arms for moving material outwardly and then upwardly and inwardly with a turning over movement.

16. In combination, a pan having a substantially flat bottom, upstanding side wall and a central tubular extension; a rotary shaft in said extension; U-shaped members secured at opposite sides to said shaft; and plates secured to the inner arms of the U-member and having their forward edges scraping said tubular extension and directing the material outwards.

17. In combination, a pan having a substantially flat bottom, upstanding side wall and a central tubular extension; a rotary shaft in said extension; U-shaped members secured at opposite sides to said shaft and having outer and inner arms leaving a wide unobstructed space between, and a base member outwardly backwardly inclined to scrape material from said bottom and toward said side wall; plates secured to the inner arms of the U-member and having their forward edges scraping said tubular extension and directing the material outwards; a forwardly disposed outer plate secured to the outer part of said body and having its forward edge engaged with said side wall, and its rear part inclined away from said wall to give a turning over motion to material.

18. In combination, a pan having a substantially flat bottom, upstanding side wall and a central tubular extension; a rotary shaft in said extension; U-shaped members secured at opposite sides to said shaft and having outer and inner arms leaving a wide unobstructed space between, and a base member outwardly backwardly inclined to scrape material from said bottom and toward said side wall; a forwardly disposed outer plate secured to the outer arm or bracket of said U-shaped member and having its forward edge engaged substantially from top to bottom of said side wall, and its rear part upwardly increasingly inclined away from said wall to give a turning over motion to material; plates secured to the inner arms of the U-member and having their forward edges scraping said tubular extension and directing the material outwards; rearwardly disposed vertical frames adjustably pivoted to said outer arms; and vertical rollers rotatable in the rear part of said frames just behind said outer plate and adapted by the adjustment of the frame to be revolved against or spaced from the side wall.

19. In combination, a pan having a side wall; a body revolving in said pan; and a forwardly disposed outer plate mounted on said body and having its forward edge substantially vertical and engaged adjacent to said wall and its rear part constructed to give a turning over motion to material at different heights.

20. In combination, a pan having a side wall; and a forwardly disposed outer plate revolving in said pan adjacent to said wall and constructed to give a circulatory turning over motion to material at different heights.

21. In combination, a pan having a side wall; a body revolving in said pan; a forwardly disposed plate mounted at its forward part on said body; and a scraper adjustably mounted on the forward edge of the plate and adjustable relative to said plate to engage adjacent to or slightly spaced from said wall.

22. In combination, a pan having a side wall; a body revolving in said pan; and a forwardly disposed scraper plate mounted at its forward part on said body and provided at its forward part with a substantially vertical scraping edge; and means whereby said edge may be adjustably disposed adjacent to or slightly spaced from said wall.

23. In combination, a pan having a wall; means for uncovering and leaving a film of material on the wall; and means for crushing said film while thus uncovered.

24. In combination, a pan; a roller revolving in said pan against the outer wall of the pan; and means removing material from said wall just in front of the roller to provide a material-free space at the front of the roller to prevent obstruction of the roller.

25. In combination, a pan; a movable plate in said pan arranged when the pan is full to leave a film of material on the pan and a material-free space behind the plate exposing said film; and a roller immediately at the rear of said space for crushing said film before the material has time to return to said space to cover the film.

26. In combination, a pan; a hard roller revolving in said pan; and means for adjustably holding the roller in crushing relation with but spaced from the wall.

27. A chocolate mixing machine comprising, a pan; a body revolving in said pan and having a relatively flat shallow base arranged movable relative to said entire bottom of the pan to scrape material upwardly substantially from the entire bottom of the pan and outwardly toward the periphery.

28. A chocolate mixing machine comprising, a pan; a body revolving in said pan and having a relatively flat shallow intermediately forwardly curved base extending approximately from center to circumference of the pan and arranged movable relative to said entire bottom of the pan to scrape material upwardly from substantially from the entire bottom of the pan and outwardly toward the periphery.

In testimony whereof I have hereunto set my hand in the presence of two witnesses.

ASBJORN SONSTHAGEN.

Witnesses:
WILLIAM T. AVIS,
EDMUND H. HARBERD.